US012365271B2

(12) United States Patent
Nakhla et al.

(10) Patent No.: US 12,365,271 B2
(45) Date of Patent: Jul. 22, 2025

(54) JUVENILE SEAT

(71) Applicant: Dorel Juvenile Group, Inc., Foxboro, MA (US)

(72) Inventors: Said S. Nakhla, Daphne, AL (US); Paul Powers, Grafton, MA (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 351 days.

(21) Appl. No.: 17/970,064

(22) Filed: Oct. 20, 2022

(65) Prior Publication Data

US 2023/0129335 A1    Apr. 27, 2023

Related U.S. Application Data

(60) Provisional application No. 63/270,307, filed on Oct. 21, 2021.

(51) Int. Cl.
*B60N 2/28* (2006.01)
(52) U.S. Cl.
CPC ......... *B60N 2/2821* (2013.01); *B60N 2/2812* (2013.01); *B60N 2/2881* (2013.01)

(58) Field of Classification Search
CPC ... B60N 2/2821; B60N 2/2812; B60N 2/2881
See application file for complete search history.

(56) References Cited

U.S. PATENT DOCUMENTS 11,072,262 B2    7/2021  Jung
2020/0290489 A1*  9/2020  Stacey

FOREIGN PATENT DOCUMENTS

CN       105946652 A  *  9/2016
WO       2006131715       12/2006
WO       2006131717       12/2006

* cited by examiner

*Primary Examiner* — Anthony D Barfield
(74) *Attorney, Agent, or Firm* — Barnes & Thornburg LLP

(57) ABSTRACT

A juvenile seat includes a seat chassis having a seat-bottom base, a seat-back base, and a body frame. The seat-bottom base is adapted to rest on a vehicle seat. The seat-back base is coupled to the seat-bottom base and is arranged to extend upwardly away from the seat-bottom base. The body frame is coupled to both the seat-bottom base and the seat-back base to provide side bolsters and wings for the juvenile seat. The juvenile seat further includes a seat suspension.

20 Claims, 6 Drawing Sheets

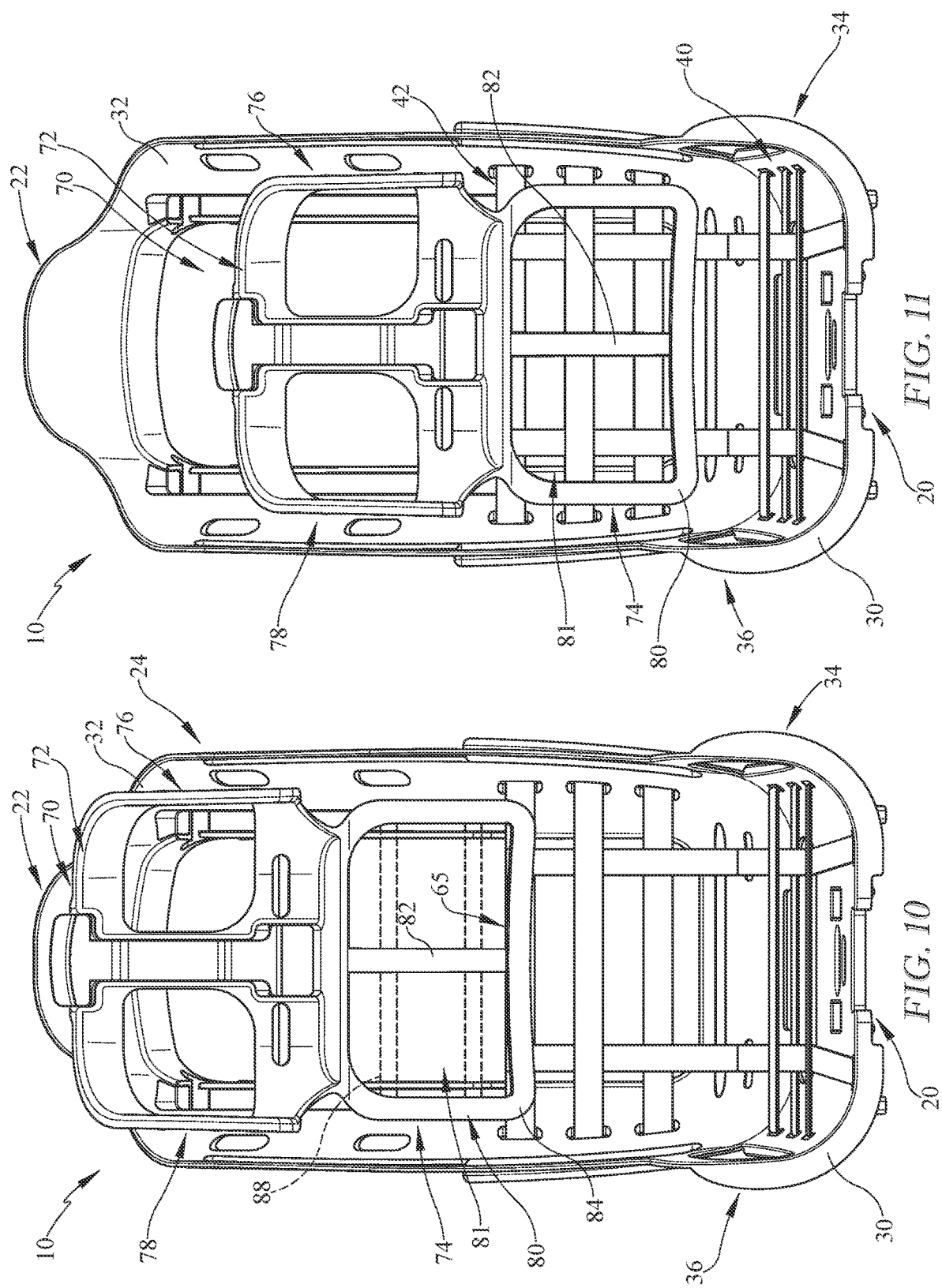

JUVENILE SEAT

PRIORITY CLAIM

This application claims priority under 35 U.S.C. § 119(e) to U.S. Provisional Application Ser. No. 63/270,307, filed Oct. 21, 2021, which is expressly incorporated by reference herein.

BACKGROUND

The present disclosure relates to a child restraint, and particularly to a juvenile seat. More particularly, the present disclosure relates to a juvenile seat that is configured to be secured to a vehicle seat for transportation in a vehicle.

SUMMARY

According to the present disclosure, a juvenile seat includes a seat chassis having a seat-bottom base, a seat-back base, and a body frame. The seat-bottom base is adapted to rest on a vehicle seat. The seat-back base is coupled to the seat-bottom base and is arranged to extend upwardly away from the seat-bottom base. The body frame is coupled to both the seat-bottom base and the seat-back base to provide side bolsters and wings for the juvenile seat.

In illustrative embodiments, the juvenile seat further includes a seat suspension configured to support a child on the juvenile seat in spaced apart relation to the seat chassis. The seat suspension is configured to increase comfort and breathability for the child while the seat chassis protects the child from impact events.

In illustrative embodiments, the seat suspension includes a seat bottom web and a seat back web. The seat bottom web is coupled to the body frame and is at least partially spaced apart from the seat-bottom base to support a child above and spaced apart from the seat-bottom base. The seat back web is coupled to the body frame and is at least partially spaced apart from the seat-back base to support the child in front of and spaced apart from the seat-back base.

In illustrative embodiments, the seat suspension may further include a mesh sheet that is arranged to overlie and is spaced apart from the seat bottom web and the seat back web. Together, the seat bottom web, the seat back web, and the mesh sheet provide two-stage load resistance during impact events. In some embodiments, the mesh sheet may be used without the seat bottom web and the seat back web. In some embodiments, the seat bottom web and the seat back web may be used without the mesh sheet.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective and diagrammatic view of a juvenile seat, in accordance with the present disclosure, including a seat chassis configured to rest on a vehicle seat and be secured to the vehicle seat and a seat suspension coupled to the seat chassis and configured to support an occupant of the juvenile seat in spaced apart relation to the seat chassis while increasing breathability and comfort for the occupant;

FIG. 2 is a perspective view of a portion of the juvenile seat from FIG. 1 with a portion of the seat suspension cut away to show that the seat suspension includes a seat bottom web, a seat back web, and a mesh sheet arranged to overlie the seat bottom web and the seat back web and configured to support the occupant of the juvenile seat while having a structure that is air permeable to increase breathability and comfort for the occupant;

FIG. 3 is an exploded assembly view of the juvenile seat from FIGS. 1 and 2 showing, from left to right, the mesh sheet, the seat bottom web and seat back web, and the seat chassis;

FIG. 4 is a sectional view taken along line 4-4 of FIG. 2 showing that the mesh sheet is spaced apart from the seat bottom web prior to any load acting on the mesh sheet and showing that the seat bottom web is at least partially spaced apart from a seat-bottom base included in the seat chassis to provide load resistance that blocks the occupant from contacting the seat chassis when the occupant imparts a load on the seat suspension as suggested in FIG. 5;

FIG. 10 is a front elevation view of the juvenile seat with the mesh sheet removed showing that the juvenile seat further includes a headrest that is movable between a raised position, as shown in FIG. 10, and a lowered position, as shown in FIG. 11 and showing that the headrest cooperates with the seat back web in both the raised position and the lowered position to support an occupant; and FIG. 11 is a front elevation view of the juvenile seat showing the headrest in the lowered position in which a greater portion of the headrest overlaps with the seat back web.

DETAILED DESCRIPTION

Figure 1:
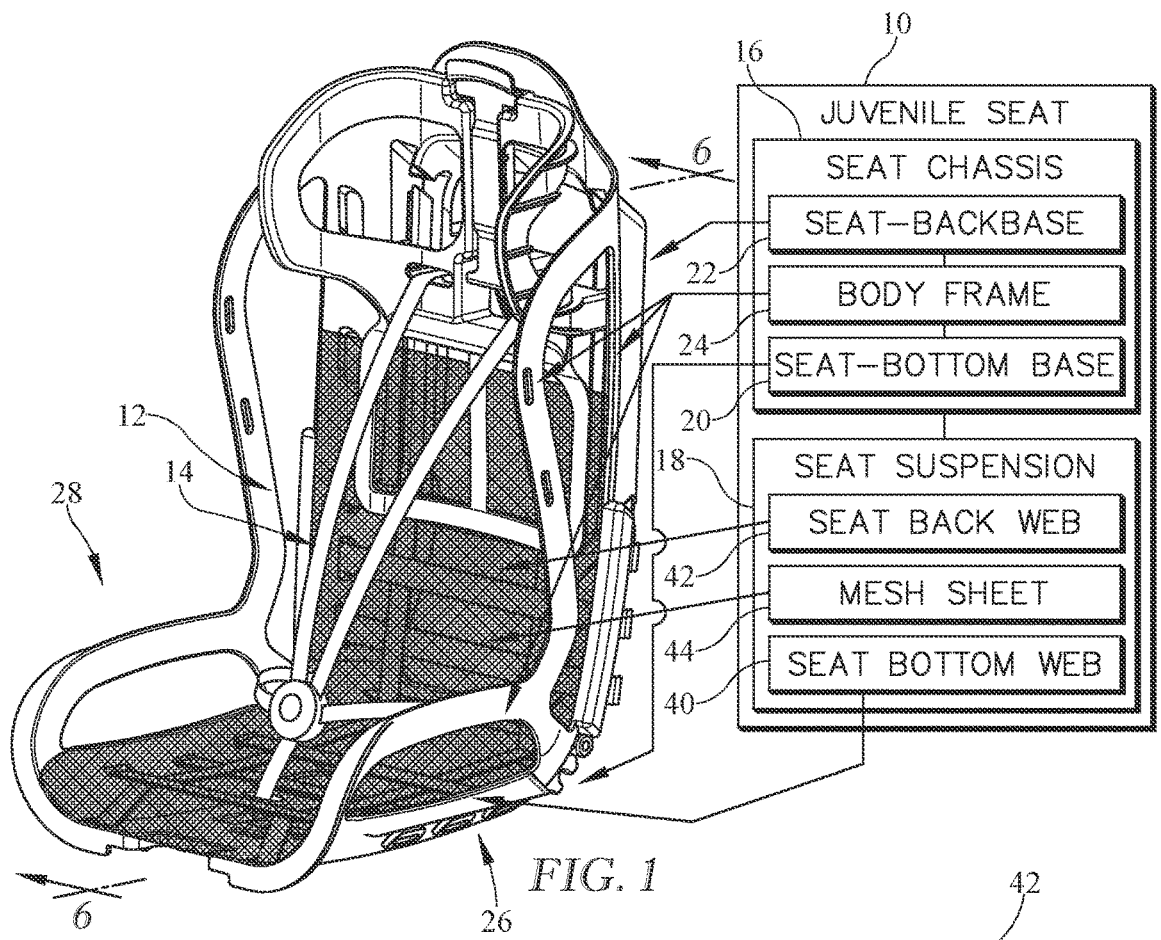
Figure 2:
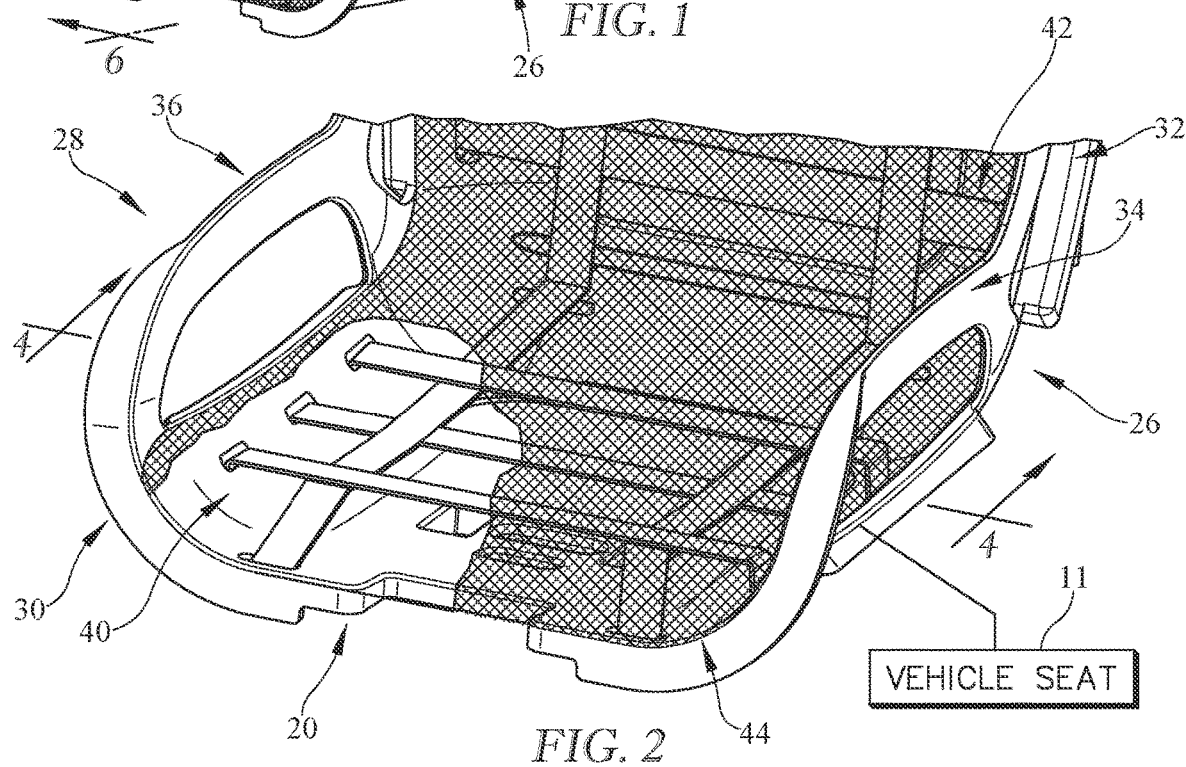

A juvenile seat 10 is adapted to be secured to a vehicle seat 11 for transportation in a vehicle as suggested in FIGS. 1 and 2. The juvenile seat 10 is formed to include a child-receiving space 12 and includes a child restraint harness 14 that is configured to secure a child to the juvenile seat 10 within the child-receiving space 12. The juvenile seat 10 is configured to maximize comfort for the child by increasing breathability for the child without sacrificing structural integrity for the child's safety.

The juvenile seat 10 in the illustrative embodiment includes a seat chassis 16 and a seat suspension 18 coupled to the seat chassis 16 as shown in FIGS. 1 and 2. The seat chassis 16 is configured to be secured to the vehicle seat 11 and is configured to provide structural rigidity for the juvenile seat 10. The seat suspension 18 is not rigid and is configured to support the child in spaced apart relation to the seat chassis 16 to increase comfort for the child seated in the child-receiving space 12.

Figure 3:
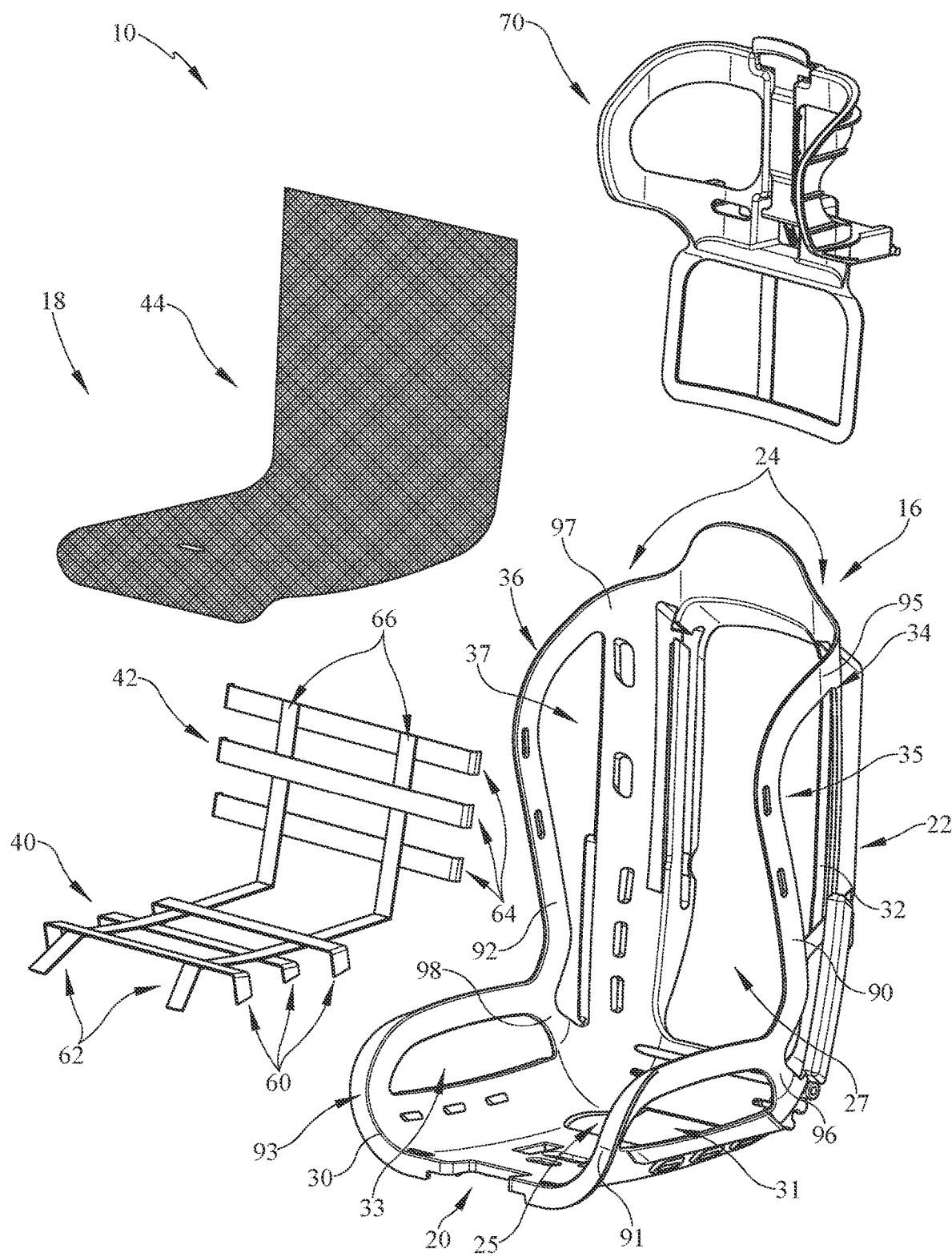

The seat chassis 16 includes a seat-bottom base 20, a seat-back base 22 coupled to the seat-bottom base 20, and a body frame 24 coupled to both the seat-bottom base 20 and the seat-back base 22 as shown in FIGS. 2 and 3. The seat-bottom base 20 and the seat-back base 22 are each adapted to rest on the vehicle seat 11. The seat back-base 22 is arranged to extend upwardly away from the seat-bottom base 20. The body frame 24 extends away from each of the seat-bottom base 20 and the seat-back base 22 along lateral sides 26, 28 of the juvenile seat 10.

The body frame 24 includes a bottom frame foundation 30 coupled to the seat-bottom base 20, a back frame foundation 32 coupled to the seat-back base 22, and a pair of frame side wings 34, 36 as shown in FIGS. 1-3. The bottom frame foundation 30 couples the side wings 34, 36 to the seat-bottom base 20. The back frame foundation 32 couples the side wings 34, 36 to the seat-back base 22. Each of the side wings 34, 36 extends away from the bottom frame foundation 30 and the back frame foundation 32 on opposing sides of the bottom frame foundation 30 and the back frame foundation 32.

The seat-bottom base 20 is formed to include a bottom aperture 25 and the seat-back base 22 is formed to include a back aperture 27 to minimize an amount of material used in forming the seat chassis 16 as shown FIG. 3. The seat suspension 18 is configured to overlie at least a portion of each of the apertures 25, 27 to block the child from passing therethrough. In the illustrative embodiment, the back aperture 27 has a height greater than half of a height of the juvenile seat 10.

Each of the frame side wings 34, 36 includes a side rail 90, 92 and a medial link 96, 98 as shown in FIG. 3. Each side rail 90, 92 has a first end 91, 93 coupled to a forward end of the bottom frame foundation 30 and a second end 95, 97 coupled to a top end of the back frame foundation 32. Each medial link 96, 98 extends between and interconnects a corresponding side rail 90, 92 and at least one of the bottom frame foundation 30 and the back frame foundation 32 between the first and second ends 91, 93, 95, 97. Side apertures 31, 33, 35, 37 are formed in each side rail 34, 36 to minimize the amount of material needed to form the seat chassis 16. Each aperture 31, 33, 35, 37 may be filled with a lightweight material such as foam or covered with portions of the seat suspension 18.

The seat chassis 16 is made from a rigid material such as a metal and/or a rigid plastic so that the seat chassis 16 is able to withstand high loads during an impact, for example. In one example, the seat chassis has a generally fixed shape during normal use so that rigidity of the seat chassis is maximized. The seat suspension 18 is made from flexible, air permeable materials to increase comfort for the child seated on the juvenile seat 10. The seat suspension 18 includes a seat bottom web 40, a seat back web 42, and a mesh sheet 44 that overlies the seat bottom web 40 and the seat back web 42. The seat bottom web 40 is coupled to the bottom frame foundation 30. The seat back web 42 is coupled to the back frame foundation 32. The mesh sheet 44 is coupled to the bottom frame foundation 30 and to the back frame foundation 32 and is spaced apart from the seat-bottom base 20 and the seat-back base 22 to support the child in spaced apart relation to the seat-bottom base 20 and the seat-back base 22.

In some embodiments, the mesh sheet 44 may be omitted such that only the seat bottom web 40 and the seat back web 42 are used to support the child. In some embodiments, the seat bottom web 40 and the seat back web 42 may be omitted such that only the mesh sheet 44 is used to support the child. In some embodiments, a seat pad 41 is applied over the seat bottom web 40 and the seat back web 42 and the mesh sheet 44 is omitted. The seat pad 41 may be made of foam, softgoods, trim material, and/or another suitable cushioning material. In some embodiments, a foam layer 43 is located beneath the seat bottom web 40 and behind the seat back web 42 and the mesh sheet 44 is omitted. In some embodiments, the foam layer 43 is located beneath and behind the mesh sheet 44 and the seat bottom web 40 and the seat back web 42 are omitted. The foam layer 43 may still be spaced apart from the mesh sheet 44 and/or the seat bottom web 40 and seat back web 42.

The mesh sheet 44 is also spaced apart from the seat bottom web 40 and the seat back web 42 as shown in FIGS. 4-9. The seat bottom web 40, the seat back web 42, and the mesh sheet 44 are free to move relative to one another and relative to the seat chassis 16 in response to loads acting on the seat suspension 18 by the child.

Figure 4:
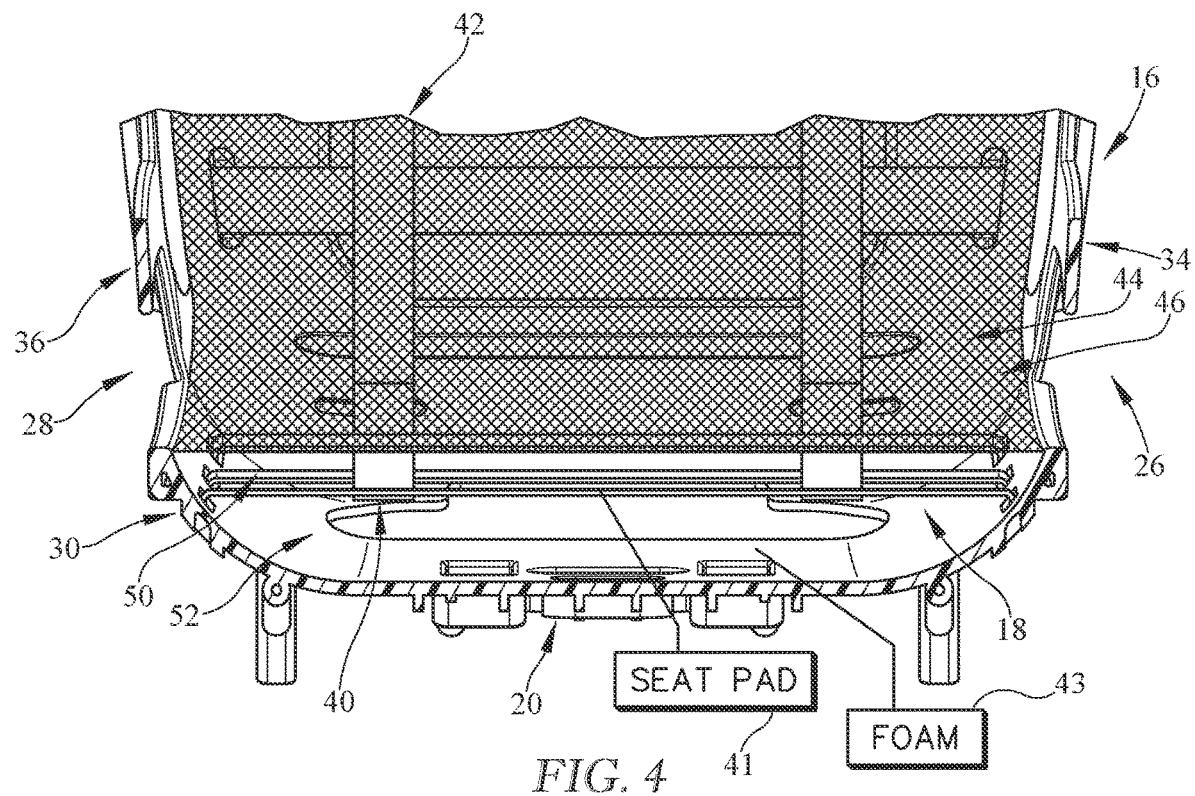
Figure 5:
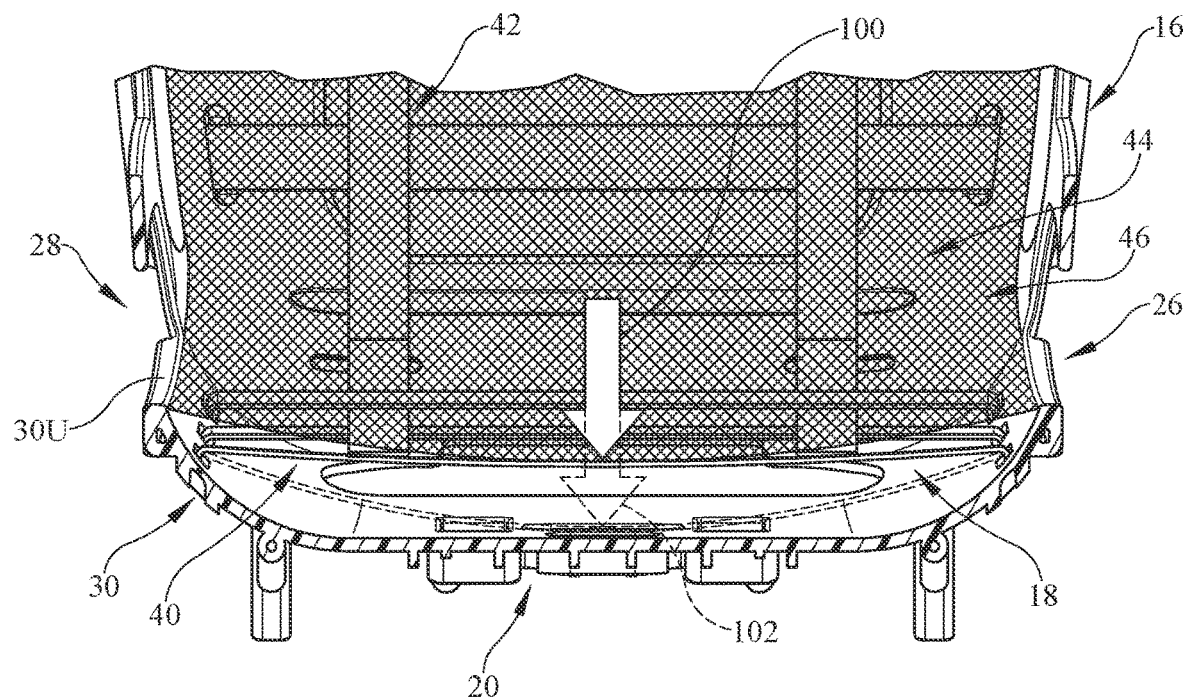
FIG. 5 is a view similar to FIG. 4 showing a load applied to the mesh sheet to cause the mesh sheet to deform relative to the seat chassis and the seat bottom web and suggesting that the seat bottom web is also deformable in response to the occupant imparting a load on the seat suspension.

In some embodiments, a first empty space 50 is established between the mesh sheet 44 and the seat bottom web 40 and a second empty space 52 is established between the seat bottom web 40 and the seat-bottom base 20 as shown in FIGS. 4 and 5. The mesh sheet 44 may at least partially close the first empty space 50 in response to a first load 100 acting on the mesh sheet 44. The mesh sheet 44 is attached to an upper end 30U of the bottom frame foundation 30 and is under tension between lateral ends 26, 28. The first load 100 is configured to deform the mesh sheet 44 and causes the first empty space 50 to decrease as the mesh sheet 44 stretches and moves toward the seat bottom web 40. Empty spaces are also established on each side of the seat back web 42.

During an impact event, a second load 102, greater than the first load 100, may be applied to the seat suspension 18 thereby causing the mesh sheet 44 and the seat bottom web 40 to stretch toward the seat-bottom base 20 as suggested in FIG. 5. Thus, the seat suspension 18 is configured to provide two-stage load resistance for the child in a seat bottom area of the juvenile seat 10. The two-stage load resistance includes a first-stage support provided by the mesh sheet 44 in response to the first load 100 acting on the seat suspension 18. With the first-stage support, only the mesh sheet 44 deforms relative to the seat chassis 16. The two-stage load resistance is followed by a second-stage support provided by both the mesh sheet 44 and the seat bottom web 40 in response to the second load 102 acting on the seat suspension 18. With the second-stage support, the mesh sheet 44 and the seat bottom web 40 deform relative to the seat chassis 16 together in response to the second load 102.

Figure 6:
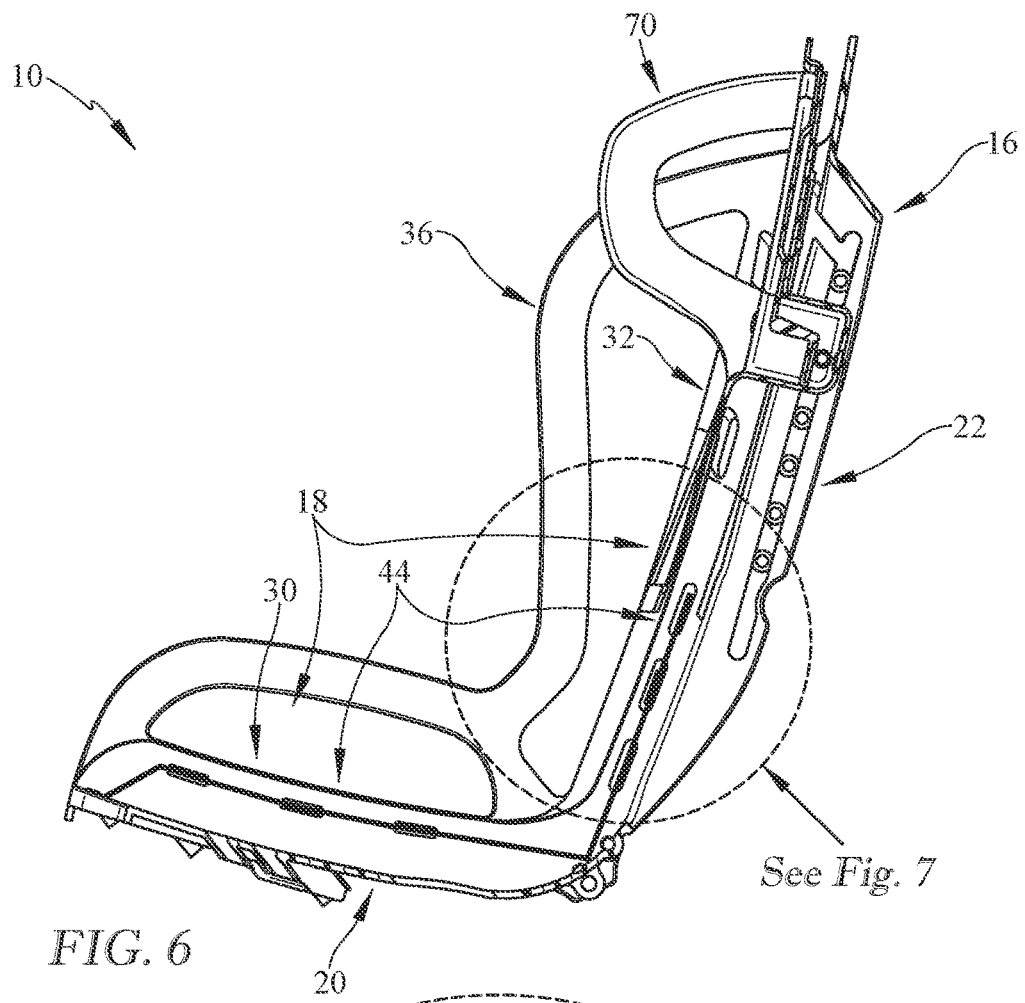
FIG. 6 is a sectional view taken along line 6-6 in FIG. 1 showing that the mesh sheet is spaced apart from both the seat-bottom web and the seat-back web to provide load resistance in both a seat bottom region of the juvenile seat and a seat back region of the juvenile seat.
Figure 7:
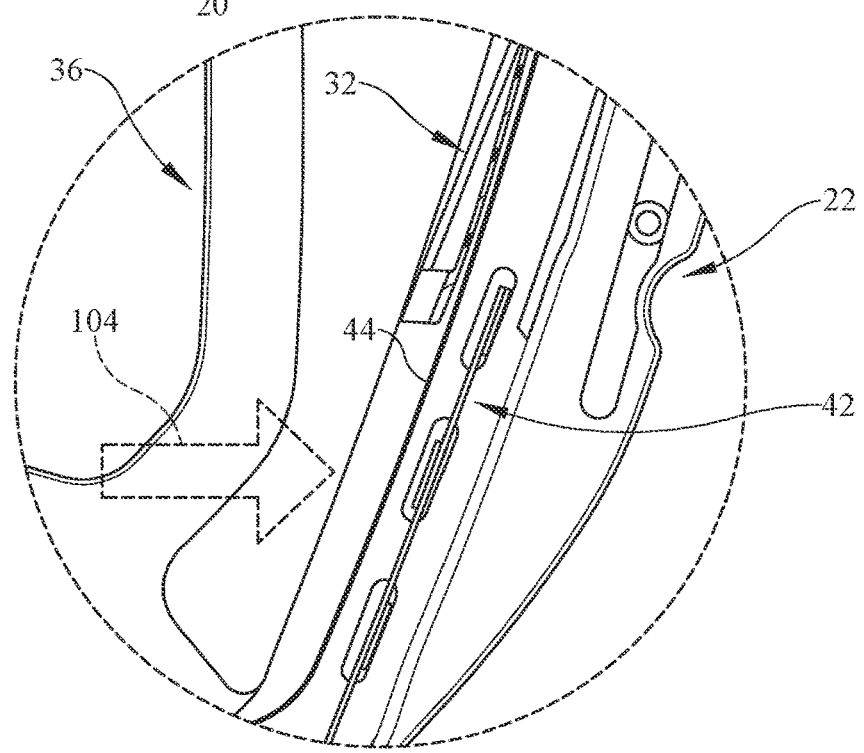
FIG. 7 is an enlarged portion of the juvenile seat of FIG. 6 showing the mesh sheet spaced apart from the seat back web prior any load acting on the mesh sheet.
Figure 8:
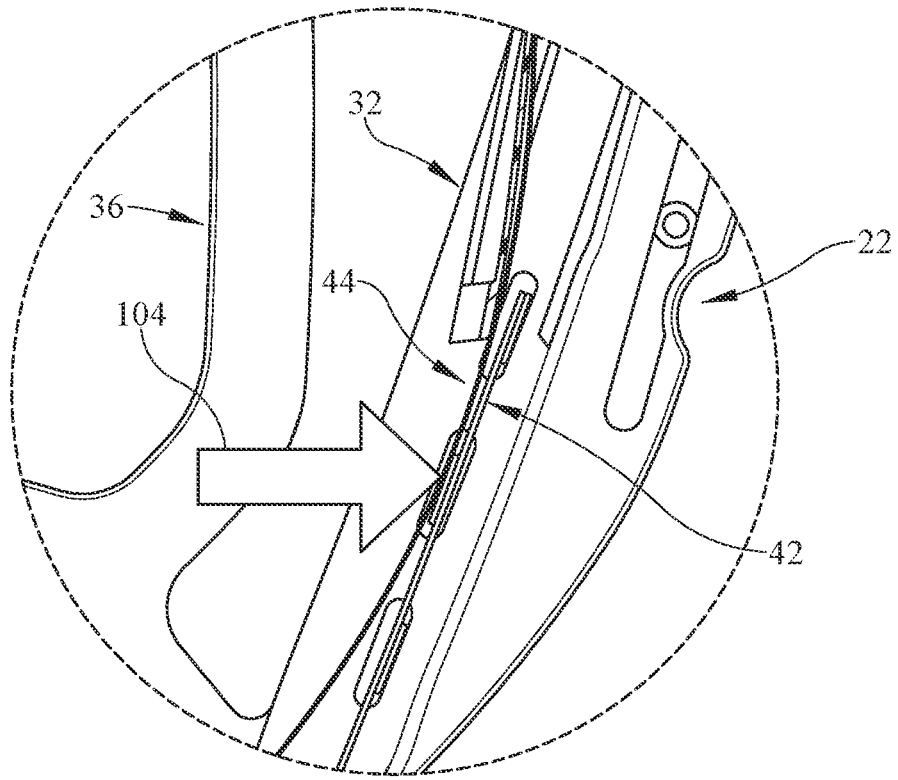
FIG. 8 is a view similar to FIG. 7 showing a first load applied on the mesh sheet to cause the mesh sheet to deform toward the seat back web so that the occupant is supported by both the mesh sheet and the seat back web.
Figure 9:
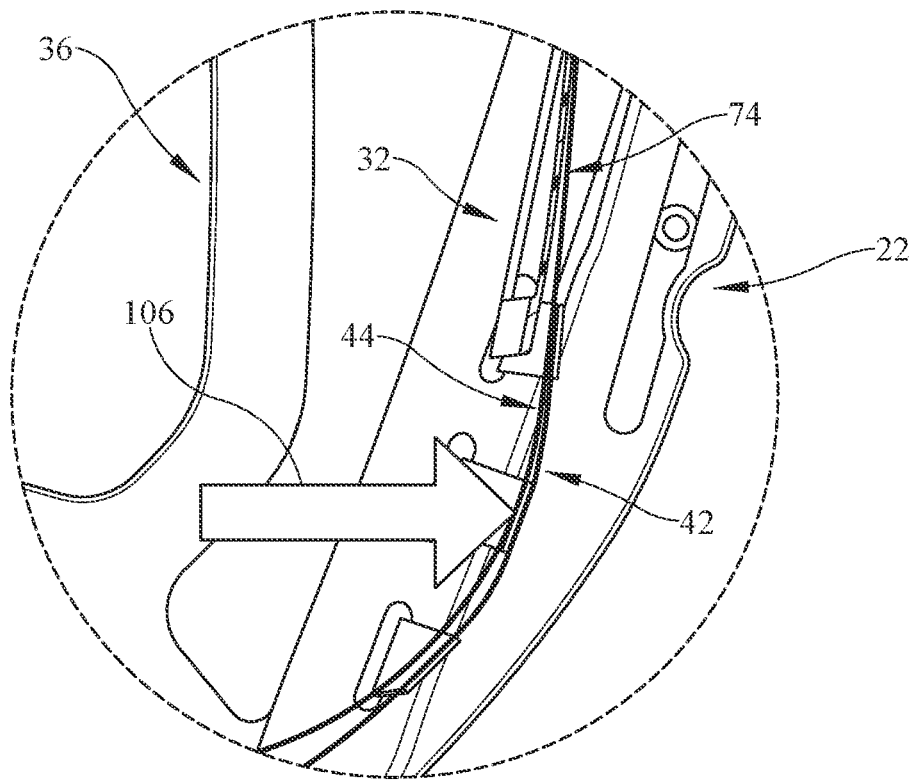
FIG. 9 is a view similar to FIG. 8 showing a second load, greater than the first load, applied to the mesh sheet to cause the mesh sheet and the seat back web to deform relative to a seat-back base included in the seat chassis.

The seat back web 42 also cooperates with the mesh sheet 44 to provide two-stage load resistance in portions of a seat back area of the juvenile seat 10 as shown in FIGS. 6-9. The two-stage load resistance includes a first-stage support provided by the mesh sheet 44 in response to a first load 104 acting on the seat suspension 18 as shown in FIGS. 7 and 8. With the first-stage support, only the mesh sheet 44 deforms relative to the seat chassis 16. The two-stage load resistance is followed by a second-stage support provided by both the mesh sheet 44 and the seat back web 42 in response to a second load 106, greater than the first load 104, acting on the seat suspension 18 as shown in FIG. 9. With the second-stage support, the mesh sheet 44 and the seat back web 42 deform relative to the seat chassis 16 together in response to the second load 106.

In the illustrative embodiment, the mesh sheet 44 may have an elasticity that limits stretching of the mesh sheet 44 all the way to the seat bottom web 40 under normal seating conditions when the child is seated on the juvenile seat 10 (i.e. before impact events). In this instance, the mesh sheet 44 is configured to support the full weight of the child without the seat bottom web 40 until an impact event occurs. In some embodiments, the mesh sheet 44 may configured to support substantially all of the weight of the child under normal seating conditions and the seat bottom web 40 may support a portion of the child's weight.

The mesh sheet 44 may have a first tensile strength while the seat bottom web 40 and the seat back web 42 each have a second tensile strength greater than the first tensile strength to provide greater support than the mesh sheet 44 during impact events. The seat suspension 18 may have a cumulative tensile strength sufficient to block deformation of the seat suspension 18 all the way to the seat-bottom base 20. Similarly, the mesh sheet 44 may have a first elasticity while the seat bottom web 40 and the seat back web 42 each have a second elasticity less than the first elasticity. These properties provide a more comfortable seating surface for the child via the mesh sheet 44 while providing for increased safety and support via the seat bottom web 40 and the seat back web 42.

The mesh sheet 44 is made from a flexible material and includes a plurality of woven or knitted strands or fibers that cooperate to provide a plurality of openings 46 that allow air to pass through the mesh sheet 44. Because of the plurality of openings 46, the mesh sheet 44 increases breathability of the juvenile seat 10 by allowing air to pass through the mesh sheet 44 and through empty spaces 50, 52. Each of the fibers may include cotton, nylon, polyester, any other suitable type of fiber, or a combination thereof. The fibers may be woven or knitted in any suitable arrangement including a plain weave, a twill weave, a plain dutch weave, twill dutch weave, a spiral weave, a satin weave, a basket weave, a leno weave, a warp knit weave, or any other suitable weave or knitting.

The seat bottom web 40 and the seat back web 42 are each formed from the same materials and include a plurality of strips 60, 62, 66, 68 as shown in FIGS. 1-3. Each of the plurality of strips 60, 62, 66, 68 may include a plurality of woven strands or fibers like the mesh sheet 44 except that the plurality of strips 60, 62, 66, 68 are more tightly woven and/or include a different weave than the mesh sheet 44. Each of the fibers may include cotton, nylon, polyester, any other suitable type of fiber, or a combination thereof. The fibers of the strips 60, 62, 66, 68 may be woven or knitted in any suitable arrangement including a plain weave, a twill weave, a plain dutch weave, twill dutch weave, a spiral weave, a satin weave, a basket weave, a leno weave, a warp knit weave, or any other suitable weave or knitting. The plurality of strips 60, 62, 66, 68 are woven such that there are no openings formed therein. However, the plurality of strips 60, 62, 66, 68 are arranged in a grid to provide openings between each strip 60, 62, 66, 68 which allows for air and other components, such as harness straps, to pass therebetween. The harness straps of child restraint harness 14 are fixed to portions of the seat chassis 16 to form a secure connection to the juvenile seat 10 so that, after bypassing the non-structural, seat suspension 18, the harness 14 is fixed to a structural component.

The seat bottom web 40 is attached to at least one of the seat-bottom base 20 and the bottom frame foundation 30 and is positioned below the mesh sheet 44 as shown in FIGS. 4 and 5. The seat bottom web 40 includes a plurality of laterally-extending strips 60 and a plurality of longitudinally-extending strips 62. Each of the laterally-extending strips 60 and the longitudinally-extending strips may be under tension prior to any load acting on them. The plurality of laterally-extending strips 60 are coupled to the bottom frame foundation 30 and spaced apart from one another. The plurality of longitudinally-extending strips 62 are coupled to the seat-bottom base 20 and are spaced apart from one another. The plurality of longitudinally-extending strips 62 cross and/or are woven with each of the plurality of laterally-extending strips 60. In the illustrative embodiment, the seat bottom web 40 includes three laterally-extending strips 60 and two longitudinally extending strips 62, however, in other embodiments, any number of strips may be used in each direction.

The seat back web 42 is attached to at least one of the seat-back base 22 and the back frame foundation 32 and is positioned behind the mesh sheet 44 as shown in FIGS. 6 and 7. The seat back web 42 includes a plurality of laterally-extending strips 64 and a plurality of vertically-extending strips 66. Each of the laterally-extending strips 64 and the vertically-extending strips may be under tension prior to any load acting on them. The plurality of laterally-extending strips 64 are coupled to the back frame foundation 32 and are spaced apart from one another. The laterally extending strips 64 traverse the entire back aperture 27. The plurality of vertically-extending strips 66 are coupled to the seat-back base 22 and are spaced apart from one another. The plurality of vertically-extending strips 66 cross and/or are woven with each of the plurality of laterally-extending strips 64. The plurality of vertically-extending strips 66 may attach to corresponding longitudinally-extending strips 62 of the seat bottom web 40. In the illustrative embodiment, the seat back web 42 includes three laterally-extending strips 64 and two vertically-extending strips 66, however, in other embodiments, any number of strips may be used in each direction.

In the illustrative embodiment, the seat suspension 18 extends across substantially an entire length of the seat-bottom base 20 as shown in FIGS. 1-3. However, the seat suspension 18 may not extend substantially across an entire height of the seat-back base 22. Instead, the juvenile seat 10 further includes a headrest 70 which may cooperate with the seat suspension 18 to support portions of the child along the seat back area. In the illustrative embodiment, the seat back web 42 and the mesh sheet 44 extend from the seat-bottom base 20 to a point that is about half of the height of the seat-back base 22. The headrest 70 then extends from the point to an upper end of the seat-back base 22.

The headrest 70 includes a headrest body 72, a headrest tail 74 coupled to a lower end of the headrest body 72, and a pair of side wings 76, 78 coupled to opposite lateral ends of the headrest body 72 as shown in FIGS. 3, 10, and 11. The headrest 70 is movable between a fully-raised position, as shown in FIG. 10, to a fully-lowered position, as shown in FIG. 11. In the fully raised position, a first extent of the headrest tail 74 overlies the seat back web 42. More particularly, in the fully-raised position, a lowermost segment 84 of the headrest tail 74 is aligned with an uppermost strip 65 of the seat back web 42. In the fully-lowered position, a second extent of the headrest tail 74, greater than the first extent, overlies the seat back web 42. The headrest body 72, headrest tail 74, and side wings 76, 78 of the headrest 70 may be formed as an integral component that is made from a rigid plastic material.

The headrest tail 74 includes a perimeter frame 80 at least partially defining an opening 81 extending through the headrest tail 74 and at least one support strip 82 extending across the opening 81 as shown in FIG. 10. The perimeter frame 80 has a width that positions lateral segments of the perimeter frame 80 in front of corresponding portions of the seat-back base 22. The support strip 82 is arranged in a generally central location on the headrest tail 74 and extends in a vertical direction along the headrest tail 74. Optional straps 88 may extend between the perimeter frame 80 and the support strip 82. The straps 88 may be substantially similar to straps 60, 62, 64, 66. The headrest 70 may further be covered by a mesh sheet 44, a trim or soft-goods material as well.

In some embodiments, the juvenile seat includes an inner seat unit having mesh child-support pads 44 that at least partially form a seat bottom and a seat back of the inner seat unit. This provides breathability that may reduce the potential of children sweating. Each mesh child-support pad 44 includes a plurality of woven or non-woven fibers that provide a thin, breathable fabric having a backside that is substantially spaced apart from the support frame 16 to allow air to flow behind and under the child seated on the child support pad 44. The mesh child-support pads 44 have openings between fibers to allow air, moisture, and heat to pass therethrough.

In some embodiments, each mesh child-support pad 44 coupled to outer rails 30, 32 included in the seat unit and tensioned to support the child in spaced apart relation to other parts of the seat unit and the support frame 16 in normal circumstances. The mesh child-support pads 44 may be coupled to an intermediate webbing 40, 42 (i.e. by sewing) and may include foam pads in some areas (around the head) for impact mitigation. Spacing or gaps are provided between the mesh child-support pads 44 and the intermediate webbing 40, 42. During an impact (i.e. a crash event), the mesh child support pads 44 may flex to close the gaps until the mesh child support-pad 44 reaches the intermediate webbing 40, 42. The intermediate webbing 40, 42 is flexible but may have a higher tensile strength than the mesh child-support pad 44 so as not to flex as much as the mesh child-support pad 44. In some embodiments, the intermediate webbing 40, 42 may not flex at all but may move slightly relative to the rails 30, 32 when exposed to a force.

In some child restraints, heat can accumulate behind the child while seated in the child seat. The child restraint 10 includes mesh portions 44 and gaps between the mesh portions 16 and structural portions (i.e. frame 20, 22 and rails 24) of the child restraint 10 to promote air circulation around the child thus dissipating the heat generated by the child's body resulting in the elimination of sweat. The use of a stretched mesh as the seating surface may also provide additional comfort and may eliminate the need to use foam as a comfort layer.

In some embodiments, the structural frame 16 may sit on the vehicle seat and can be attached to the vehicle using either the vehicle seatbelt or through the ISOFIX anchors. The frame may be produced using any of or any combination of the following technologies: a gas assisted injection molding process; an injection molding process; an overmolding of metal structure; an alloy injection molding process. In one example, at least one alloy used to form the frame 12 is magnesium.

In some embodiments, the seat unit may include a frame 16 and a mesh fabric material 44 strung on that frame 16 to form a seating surface for the child. In some embodiments, the mesh 44 may be strung directly on the structural frame 16. The seating surface includes two areas, one to support the child's bottom and the other to support the child's back. These two surfaces include a porous mesh to allow air circulation around the child body. The shape of the frame may extend to limit the lateral movement of the child supporting the shoulders and thighs of the child. The seat unit may be fitted with a headrest 70 composed of substantially the same mesh material as the seat unit. The headrest 70 may be movable to adjust to different heights to accommodate different sizes of children. The frame of the headrest 70 may be shaped with side wings limiting the lateral movement of the child's head.

The child restraint 10 further includes a harness system 14. In some embodiments, the harness system is a 5-point harness system. The harness may be fitted with an adjustment mechanism to allow the harness length to be adjusted to fit snugly around different size children. The harness 14 may also be routed through the headrest so the height of the harness will automatically adjust with the height of the headrest.

The invention claimed is:

1. A juvenile seat comprising
a seat chassis including a seat-bottom base adapted to rest on a vehicle seat, a seat-back base coupled to the seat-bottom base and arranged to extend upwardly away from the seat-bottom base, and a body frame coupled to both the seat-bottom base and the seat-back base, and
a seat suspension including a seat bottom web coupled to the body frame and at least partially spaced apart from the seat-bottom base to support a child above and spaced apart from the seat-bottom base and a seat back web coupled to the body frame and at least partially spaced apart from the seat-back base to support the child in front of and spaced apart from the seat-back base,
wherein the body frame includes a bottom frame foundation coupled to the seat-bottom base, a back frame foundation coupled to the seat-back base, and a pair of frame side wings coupled to opposing sides of the bottom frame foundation and the back frame foundation,
wherein the seat bottom web includes a plurality of laterally-extending strips coupled to the bottom frame foundation and spaced apart from one another and a plurality of longitudinally-extending strips coupled to the seat-bottom base and that are spaced apart from one another and cross each of the plurality of laterally-extending strips, and wherein the seat back web includes a plurality of laterally-extending strips coupled the back frame foundation and spaced apart from one another and a plurality of vertically-extending strips coupled to the seat-back base and spaced apart from one another and that are spaced apart from one another and cross each of the plurality of laterally-extending strips of the seat back web, and
wherein the seat-back base is formed to include a back aperture that has a height greater than half of a height of the juvenile seat, and wherein the laterally extending strips traverse the entire aperture.

2. The juvenile seat of claim 1, wherein the seat suspension further includes a mesh sheet coupled to the bottom frame foundation and to the back frame foundation and spaced apart from seat bottom web and the seat back web to locate the seat bottom web between the mesh sheet and the seat-bottom base and to locate the seat back web between the mesh sheet and the seat-back base.

3. The juvenile seat of claim 1, wherein the seat suspension further includes a mesh sheet coupled to the body frame and spaced apart from the seat bottom web and the seat back web.

4. The juvenile seat of claim 1, wherein the seat suspension further includes a mesh sheet coupled to the body frame and spaced apart from the seat bottom web and the seat back web and wherein the mesh sheet is flexible and includes a plurality of woven strands that cooperate to provide a plurality of openings that allow air to pass through the mesh sheet, and wherein the seat bottom web and the seat back web each include a plurality of flexible strips that underlie the mesh sheet.

5. The juvenile seat of claim 4, wherein the mesh sheet has a first tensile strength and each of the plurality of flexible strips have a second tensile strength greater than the first tensile strength.

6. The juvenile seat of claim 4, wherein a first empty space is established between the mesh sheet and the seat base web and a second empty space is established between the seat base web and the seat-bottom base.

7. The juvenile seat of claim 6, wherein the mesh sheet is configured to contact the at least one of the seat bottom web and the seat back web in response to the second force to close at least a portion of the first empty space.

8. A juvenile seat comprising
a seat chassis including a seat-bottom base adapted to rest on a vehicle seat, a seat-back base coupled to the seat-bottom base and arranged to extend upwardly away from the seat-bottom base, and a body frame coupled to both the seat-bottom base and the seat-back base, and
a seat suspension including a seat bottom web coupled to the body frame and at least partially spaced apart from the seat-bottom base to support a child above and spaced apart from the seat-bottom base and a seat back web coupled to the body frame and at least partially spaced apart from the seat-back base to support the child in front of and spaced apart from the seat-back base,
wherein the body frame includes a bottom frame foundation coupled to the seat-bottom base, a back frame foundation coupled to the seat-back base, and a pair of frame side wings coupled to opposing sides of the bottom frame foundation and the back frame foundation, and
wherein each of the frame side wings includes a side rail having a first end coupled to a forward end of the bottom frame foundation and a second end coupled to a top end of the back frame foundation and a medial link extending between and interconnecting the side rail and at least one of the bottom frame foundation and the back frame foundation between the first and second ends.

9. The juvenile seat of claim 8, wherein at least one aperture is formed between each side rail and the seat back base.

10. A juvenile seat comprising
a seat chassis including a seat-bottom base adapted to rest on a vehicle seat, a seat-back base coupled to the seat-bottom base and arranged to extend upwardly away from the seat-bottom base, and a body frame coupled to both the seat-bottom base and the seat-back base, and
a seat suspension including a seat bottom web coupled to the body frame and at least partially spaced apart from the seat-bottom base to support a child above and spaced apart from the seat-bottom base and a seat back web coupled to the body frame and at least partially spaced apart from the seat-back base to support the child in front of and spaced apart from the seat-back base,
wherein the seat suspension further includes a mesh sheet coupled to the body frame and spaced apart from the seat bottom web and the seat back web,
wherein the seat suspension is configured to provide two-stage load resistance including a first-stage support provided by the mesh sheet in response to a first load acting on the seat suspension in which only the mesh sheet deforms relative to the seat chassis and a second-stage support provided by the mesh sheet and at least one of the seat bottom web and the seat back web in response to a second force acting on the seat suspension greater than the first force in which the mesh sheet and the at least one of the seat bottom web and the seat back web stretches toward the seat chassis.

11. The juvenile seat of claim 10, wherein the mesh sheet is flexible and includes a plurality of woven strands that cooperate to provide a plurality of openings that allow air to pass through the mesh sheet, and wherein the seat bottom web and the seat back web each include a plurality of flexible strips that underlie the mesh sheet.

12. The juvenile seat of claim 11, wherein the mesh sheet has a first tensile strength and each of the plurality of flexible strips have a second tensile strength greater than the first tensile strength.

13. The juvenile seat of claim 10, wherein a first empty space is established between the mesh sheet and the seat base web and a second empty space is established between the seat base web and the seat-bottom base, and
wherein the mesh sheet is configured to contact the at least one of the seat bottom web and the seat back web in response to the second force to close at least a portion of the first empty space.

14. The juvenile seat of claim 10, further comprising a headrest including a headrest body, a headrest tail coupled to a lower end of the headrest body, and a pair of side wings coupled to opposite lateral ends of the headrest body, and wherein the headrest is movable between a fully-raised position, in which a first extent of the headrest tail overlies the seat back web, and a fully-lowered position, in which a second extent of the headrest tail overlies the seat back web, the first extent being less than the second extent.

15. The juvenile seat of claim 10, wherein the body frame includes a side rail having a first end coupled to a forward end of the seat-bottom base, a second end coupled to a top end of the seat-back base, and a medial link extending between and interconnecting the side rail and at least one of the seat-bottom base and the seat-back base between the first and second ends.

16. The juvenile seat of claim 10, wherein the seat-back base is formed to include a back aperture that has a height greater than half of a height of the juvenile seat, and wherein the laterally extending strips traverse the entire aperture.

17. A juvenile seat comprising
a seat chassis including a seat-bottom base adapted to rest on a vehicle seat, a seat-back base coupled to the seat-bottom base and arranged to extend upwardly away from the seat-bottom base, and a body frame coupled to both the seat-bottom base and the seat-back base, a seat suspension including a seat bottom web coupled to the body frame and at least partially spaced apart from the seat-bottom base to support a child above and spaced apart from the seat-bottom base and a seat back web coupled to the body frame and at least partially spaced apart from the seat-back base to support the child in front of and spaced apart from the seat-back base, and a headrest including a headrest body, a headrest tail coupled to a lower end of the headrest body, and a pair of side wings coupled to opposite lateral ends of the headrest body, and wherein the headrest is movable between a fully-raised position, in which a first extent of the headrest tail overlies the seat back web, and a fully-lowered position, in which a second extent of the headrest tail overlies the seat back web, the first extent being less than the second extent.

18. The juvenile seat of claim 17, wherein, in the fully-raised position, a lower end of the headrest tail is aligned with an upper end of the seat back web.

19. The juvenile seat of claim 17, wherein the headrest tail includes a perimeter frame at least partially defining an opening extending through the headrest tail and at least one support strip extending across the opening.

20. The juvenile seat of claim 17, wherein the seat suspension further includes a mesh sheet coupled to the bottom frame foundation and to the back frame foundation and spaced apart from seat bottom web and the seat back web to locate the seat bottom web between the mesh sheet and the seat-bottom base and to locate the seat back web between the mesh sheet and the seat-back base.

* * * * *